Oct. 2, 1945.  G. A. ELLESTAD  2,385,975
OPHTHALMIC MOUNTING
Filed Jan. 13, 1944
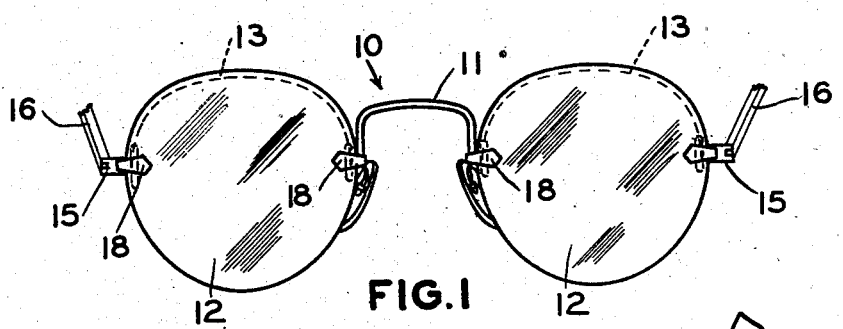
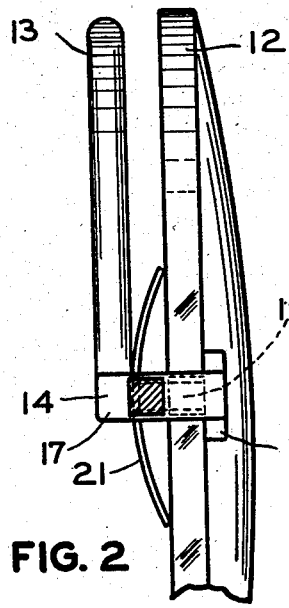
FIG. 2
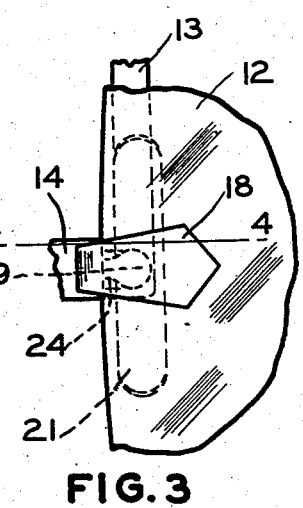
FIG. 3
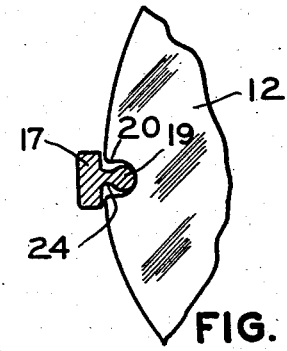
FIG. 5
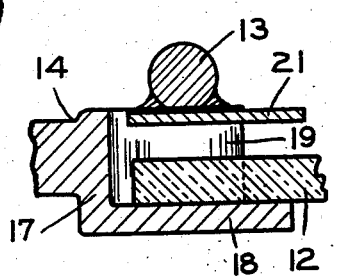
FIG. 4
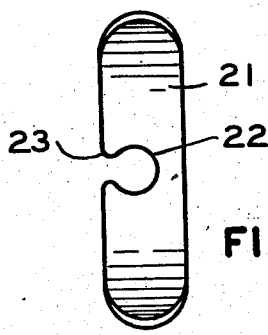
FIG. 6
GERHARD A. ELLESTAD
INVENTOR
BY
ATTORNEYS Patented Oct. 2, 1945

2,385,975

UNITED STATES PATENT OFFICE 2,385,975

OPHTHALMIC MOUNTING

Gerhard A. Ellestad, Rochester, N. Y., assignor to Bausch & Lomb Optical Company, Rochester, N. Y., a corporation of New York Application January 13, 1944, Serial No. 518,065

3 Claims. (Cl. 88—47)

This invention relates to ophthalmic mountings and more particularly it has reference to means for detachably securing lenses in mountings.

One of the objects of my invention is to provide an improved ophthalmic mounting wherein the lenses are detachably held by a resilient arm carrying lugs which engage openings in the edges of the lenses. Another object is to provide an ophthalmic mounting wherein the lens is engaged by holding means secured to an arm and the front surface of the lens is urged forwardly by resilient means against a part on said holding means. These and other objects and advantages reside in certain novel features of construction, arrangement and combination of parts as will hereinafter be more fully described and pointed out in the appended claims.

Referring to the drawing:

Fig. 1 is a front view of an ophthalmic mounting embodying my invention.

Fig. 2 is an enlarged fragmentary side view of the lug and strap, with parts in section.

Fig. 3 is a fragmentary front view of the strap.

Fig. 4 is a view taken on line 4—4 of Fig. 3.

Fig. 5 is a view showing the relation of the lug and notch in the lens.

Fig. 6 is a front view of the resilient member.

A preferred embodiment of my invention is disclosed in the drawing wherein there is illustrated a spectacle 10 embodying a bridge 11 connecting the two lenses 12. Positioned rearwardly of each lens and extending along the upper peripheral portion thereof is a resilient arm 13 having the lens holding devices 14 secured, respectively, on its nasal and temporal end portions. The lens holding devices 14 at the nasal ends of arms 13 are attached to the bridge 11 while those at the temporal ends of arms 13 carry the usual endpieces 15 for pivotally supporting temples 16, all as is well understood by those skilled in the art.

The lens holding device 14 comprises a member 17 which extends forwardly from the arm 13 and terminates in a laterally extending strap 18 which is adapted to engage the front surface of lens 12. The member 17 also carries a lug 19 which extends between the strap 18 and the arm 13 and is positioned in a notch 20 formed in lens 12. Positioned between the arm 13 and the rear surface of lens 12 is a leaf spring 21 having an opening 22 with a reduced mouth 23 which cooperates with the narrow neck 24 on lug 19 to hold the spring on the lug. As will be understood by those skilled in the art, the spring 21 may be attached to lug 19 by slightly twisting one of the portions of mouth 23 relative to the other. Or the spring 21 may be slid over the rear end of lug 19 before the arm 13 is soldered to the rear face of the lug.

Each lens 12 has a notch 20 formed, respectively, in its nasal and temporal edges to receive the lugs 19 attached, respectively, to the bridge 11 and endpiece 15. It will be apparent that a lens 12 may be inserted in the mounting by flexing the resilient arm 13 so as to further separate the respective ends of arm 13 and permit the lugs 19 to engage the notches 20 in the lens. The resilience of the arm 13 will then hold the lugs 19 in notches 20 so that the lens 12 is thereby detachably secured in the mounting. The leaf springs 21, secured to each lug 19, normally tend to urge the lens 12 forwardly so that the front face of lens 12 engages the strap 18. Hence, lenses of various thickness can be mounted on the lug 19 since the spring 21 yieldably urges the lens against the strap 18 and so compensates for varying thicknesses of lenses. The lenses 12 are thereby resiliently held and will therefore be cushioned against possible mechanical strain. The springs 21 preferably extend below the lugs 19 so as to yieldably support the lens and permit it to rock forwards and backwards since the lugs are slightly smaller than the notches as shown in Fig. 5.

From the foregoing, it will be apparent that I am able to attain the objects of my invention and provide an improved ophthalmic mounting in which the lenses are detachably held by lugs extending forwardly from arms positioned rearwardly of the lenses. Various modifications can obviously be made without departing from the spirit of my invention as pointed out in the appended claims.

I claim:

1. An ophthalmic mounting comprising a bridge; a lens having openings at the nasal and temporal edge portions thereof; a resilient arm secured to the bridge and extending from the nasal portion to the temporal portion of the lens, said arm extending along the upper peripheral portion of the lens and lying in a plane spaced rearwardly of the lens; lugs extending forwardly from the end portions of said arm, said lugs respectively engaging the walls of said openings and being held therein by the resilience of said arm, said openings being larger than the cross-section of the lugs; a strap mounted forwardly of each lug and resilient means carried by each end portion of the arm for urging the lens forwardly against said straps, said means comprising a leaf spring having only upper and lower spaced contacts with the rear surface of the lens whereby the lens may be rocked back and forth.

2. An ophthalmic mounting comprising a bridge; a lens having notches in its nasal and temporal edge portions; a resilient arm having one end portion attached to the bridge, said arm extending along the upper peripheral portion of the lens and terminating adjacent the notch in the temporal side of the lens, said arm lying in a plane which is spaced rearwardly of the lens; a lug extending forwardly from each end portion of the arm, said lugs being slightly smaller than said notches and respectively engaging the latter and being retained therein by the resilience of said arm; lens straps mounted at the forward ends of the lugs; and a spring member carried by each end portion for yieldably urging the front surface of the lens against the straps, said member engaging the lens at only two spaced points located, respectively, above and below the lug whereby the lens may be yieldably rocked forwards and backwards.

3. An ophthalmic mounting comprising a bridge; a lens having notches in its nasal and temporal edge portions; a resilient arm having one end portion attached to the bridge, said arm extending along the upper peripheral portion of the lens and terminating adjacent the notch in the temporal side of the lens, said arm lying in a plane which is spaced rearwardly of the lens; a lug extending forwardly from each end portion of the arm, said lugs being smaller in cross-section than the notches, said lugs respectively engaging the notches in the lens and being retained therein by the resilience of said arm; lens straps mounted at the forward ends of the lugs; and a leaf spring member carried by each end portion for yieldably urging the front surface of the lens against the straps, each spring member having a notch with a reduced mouth for receiving a correspondingly shaped portion on the adjacent lug for retaining the member in position, each member having only upper and lower portions engaging the rear surface of the lens, said portions lying respectively above and below the lug whereby the lens is resiliently mounted and adapted to rock backwards and forwards against the tension of the spring member.

GERHARD A. ELLESTAD.